US010944764B2

(12) United States Patent
Mixer

(10) Patent No.: US 10,944,764 B2
(45) Date of Patent: Mar. 9, 2021

(54) SECURITY EVENT DETECTION THROUGH VIRTUAL MACHINE INTROSPECTION

(71) Applicant: Fisher-Rosemount Systems, Inc., Round Rock, TX (US)

(72) Inventor: Robert A. Mixer, Cedar Park, TX (US)

(73) Assignee: Fisher-Rosemount Systems, Inc., Round Rock, TX (US)

(*) Notice: Subject to any disclaimer, the term of this patent is extended or adjusted under 35 U.S.C. 154(b) by 0 days.

(21) Appl. No.: 14/622,224

(22) Filed: Feb. 13, 2015

(65) Prior Publication Data

US 2016/0241573 A1    Aug. 18, 2016

(51) Int. Cl.
| | |
|---|---|
| H04L 29/06 | (2006.01) |
| G06F 9/455 | (2018.01) |
| G06F 21/57 | (2013.01) |
| G06F 21/56 | (2013.01) |
| G06F 21/53 | (2013.01) |

(52) U.S. Cl.
CPC ...... H04L 63/1416 (2013.01); G06F 9/45558 (2013.01); G06F 21/53 (2013.01); G06F 21/566 (2013.01); G06F 21/57 (2013.01); H04L 63/20 (2013.01); G06F 2009/4557 (2013.01); G06F 2009/45587 (2013.01); G06F 2009/45591 (2013.01)

(58) Field of Classification Search
CPC . H04L 63/1416; H04L 63/20; G06F 9/45558; G06F 21/53; G06F 21/566; G06F 21/57
See application file for complete search history.

(56) References Cited

U.S. PATENT DOCUMENTS 7,127,743 B1* 10/2006 Khanolkar ............ G06F 21/552
726/23
7,272,731 B2* 9/2007 Chaiken ................ G06F 1/3228
713/300
(Continued)

FOREIGN PATENT DOCUMENTS

| EP | 2506098 | 10/2012 |
| JP | 2014215622 | 11/2014 |
| WO | 2009097610 | 8/2009 |

OTHER PUBLICATIONS

Definitions of severity OneLook Dictionary Search.*
(Continued)

*Primary Examiner* — Mahfuzur Rahman
*Assistant Examiner* — Richard W Cruz-Franqui
(74) *Attorney, Agent, or Firm* — Hanley, Flight & Zimmerman, LLC

(57) ABSTRACT

Methods and apparatus are disclosed for security event detection through virtual machine introspection. Example methods involve monitoring usage of a plurality of resources by a first virtual machine executing on a computing device by a monitoring agent, the monitoring agent executing on the computing device separate from the first virtual machine. Example methods further involve detecting a potential security event by comparing the usage of the plurality of resources to resource usage patterns. Example methods further involve assigning a severity level to the detected potential security event, and initiating a security action defined for the assigned severity level.

22 Claims, 7 Drawing Sheets

(56) References Cited

U.S. PATENT DOCUMENTS

| | | | | |
|---|---|---|---|---|
| 8,141,127 B1* | 3/2012 | Mustafa | G06F 21/552 | 726/1 |
| 8,321,958 B1* | 11/2012 | Fleming | G06F 16/9535 | 726/29 |
| 8,327,442 B2* | 12/2012 | Herz | H04L 63/1425 | 726/23 |
| 8,458,791 B2* | 6/2013 | Do | G06F 12/1483 | 726/22 |
| 8,479,276 B1* | 7/2013 | Vaystikh | G06F 21/577 | 726/13 |
| 8,499,170 B1* | 7/2013 | Tongshu | G06F 21/566 | 713/193 |
| 8,607,344 B1* | 12/2013 | Libenzi | G06F 21/566 | 726/23 |
| 8,750,121 B2* | 6/2014 | Allan | H04L 45/24 | 370/235 |
| 8,863,279 B2* | 10/2014 | McDougal | H04L 63/1416 | 726/22 |
| 8,918,785 B1* | 12/2014 | Brandwine | G06F 9/455 | 718/1 |
| 8,972,400 B1* | 3/2015 | Kapczynski | G06F 16/13 | 707/732 |
| 9,081,911 B2* | 7/2015 | Powers | G06F 13/4252 | |
| 9,092,376 B1* | 7/2015 | Chelur | G06F 11/3485 | |
| 9,223,970 B2* | 12/2015 | Qureshi | G06F 8/70 | |
| 9,373,203 B1* | 6/2016 | Fields | A61B 5/18 | |
| 9,609,456 B2* | 3/2017 | Valencia | G06F 21/567 | |
| 9,894,157 B2* | 2/2018 | McShane | G06F 3/0683 | |
| 2002/0083343 A1* | 6/2002 | Crosbie | G06F 21/552 | 726/23 |
| 2004/0117624 A1* | 6/2004 | Brandt | H04L 69/329 | 713/166 |
| 2005/0024235 A1* | 2/2005 | Shuey | H04Q 9/00 | 340/870.03 |
| 2005/0200493 A1* | 9/2005 | Marishak, Jr. | G01N 27/20 | 340/652 |
| 2005/0278777 A1* | 12/2005 | Loza | H04L 63/1433 | 726/4 |
| 2006/0161984 A1* | 7/2006 | Phillips | G06F 21/564 | 726/24 |
| 2007/0143851 A1* | 6/2007 | Nicodemus | H04L 63/105 | 726/25 |
| 2007/0192859 A1* | 8/2007 | Shahar | H04L 63/145 | 726/22 |
| 2008/0232265 A1* | 9/2008 | Kakiuchi | G06F 16/951 | 370/252 |
| 2009/0077666 A1* | 3/2009 | Chen | G06Q 10/0631 | 726/25 |
| 2010/0205014 A1* | 8/2010 | Sholer | G06Q 10/00 | 705/4 |
| 2010/0235585 A1* | 9/2010 | Dowlatkhah | G06F 16/213 | 711/136 |
| 2010/0312130 A1* | 12/2010 | Zhang | A61B 5/02 | 600/508 |
| 2011/0238936 A1* | 9/2011 | Hayden | G06F 11/1076 | 711/162 |
| 2012/0151209 A1* | 6/2012 | Visnyak | H04L 63/105 | 713/166 |
| 2013/0247205 A1* | 9/2013 | Schrecker | G06F 21/577 | 726/25 |
| 2013/0268994 A1* | 10/2013 | Cooper | G06F 21/566 | 726/1 |
| 2013/0298242 A1* | 11/2013 | Kumar | G06F 21/564 | 726/25 |
| 2013/0332410 A1* | 12/2013 | Asano | G06K 9/00335 | 707/609 |
| 2014/0096134 A1* | 4/2014 | Barak | G06F 21/566 | 718/1 |
| 2014/0172706 A1* | 6/2014 | Condry | G06Q 30/00 | 705/44 |
| 2014/0280095 A1* | 9/2014 | Friedman | H04L 51/36 | 707/723 |
| 2014/0282539 A1* | 9/2014 | Sonnek | G06F 9/45558 | 718/1 |
| 2014/0337836 A1* | 11/2014 | Ismael | G06F 9/45558 | 718/1 |
| 2015/0013008 A1* | 1/2015 | Lukacs | G06F 21/53 | 726/24 |
| 2015/0040134 A1* | 2/2015 | Leggette | G06F 3/0689 | 718/103 |
| 2015/0128205 A1* | 5/2015 | Mahaffey | H04L 63/18 | 726/1 |
| 2015/0163088 A1* | 6/2015 | Anschutz | G06F 11/3051 | 709/224 |
| 2015/0199515 A1* | 7/2015 | Qureshi | G06F 21/563 | 726/22 |
| 2015/0236896 A1* | 8/2015 | Brown | H04L 43/08 | 709/201 |
| 2015/0373119 A1* | 12/2015 | Kaneko | G06F 9/5044 | 709/219 |
| 2015/0378633 A1* | 12/2015 | Sahita | G06F 9/45558 | 711/163 |
| 2016/0004852 A1* | 1/2016 | McEvoy | H04L 63/08 | 726/7 |
| 2016/0021131 A1* | 1/2016 | Heilig | H04L 63/1425 | 726/23 |
| 2016/0055326 A1* | 2/2016 | Votaw | H04L 63/08 | 726/19 |
| 2016/0080399 A1* | 3/2016 | Harris | H04L 63/1433 | 726/23 |
| 2016/0110215 A1* | 4/2016 | Bonilla | G06F 9/45558 | 718/1 |
| 2016/0162685 A1* | 6/2016 | Feroz | G06F 9/45558 | 726/22 |
| 2016/0241573 A1* | 8/2016 | Mixer | G06F 21/53 | |
| 2016/0374136 A1* | 12/2016 | Moisio | H04W 28/0236 | |
| 2017/0201545 A1* | 7/2017 | Nicodemus | G06F 21/55 | |
| 2018/0004948 A1* | 1/2018 | Martin | G06F 21/566 | |

OTHER PUBLICATIONS

NPL Search (Google Scholar) (Year: 2020).*

Great Britain Intellectual Property Office, "Search Report," issued in connection with Application No. GB1602099.2, dated Jun. 30, 2016, 3 pages.

* cited by examiner

400

DEFINE SECURITY PATTERNS

| USB_DETECT | LOW ▽ | HW ▽ | DETECT_NEW_USB IS TRUE; |
| INITIAL_MEM_CHANGE | MEDIUM ▽ | MEM ▽ | VALUES_UNCHANGED_FROM_BOOT IS FALSE; |
| SECURITY_LOG | HIGH ▽ | MEM ▽ | SECURITY_LOG_ERASED IS TRUE; |

402  404  405  406

( UPDATE )  ( CANCEL )

DEFINE SECURITY ACTIONS  — 502

| HIGH | MIGRATE FUNCTIONALITY TO NEW VM ▽ |
| 404 | TERMINATE CURRENT VM ▽ |
| MEDIUM | SET INDUSTRIAL APPLICATION(S) TO READ ONLY ▽ |
|  | SEND ALERT ▽ |
| LOW | SEND ALERT ▽ |

( UPDATE )  ( CANCEL )

FIG. 5

SECURITY EVENT DETECTION THROUGH VIRTUAL MACHINE INTROSPECTION

FIELD OF THE DISCLOSURE

The present disclosure relates generally to process control systems and, more particularly, to methods and apparatus for security event detection through virtual machine introspection.

BACKGROUND

Process control systems, like those used in chemical, petroleum or other processes, typically include one or more process controllers communicatively coupled to at least one host or operator workstation and to one or more field devices via analog, digital or combined analog/digital buses. The field devices, which may be, for example, device controllers, valves, valve positioners, switches and transmitters (e.g., temperature, pressure and flow rate sensors), perform functions within the process control system such as opening or closing valves and measuring process parameters. A process controller receives signals indicative of process measurements made by the field devices and/or other information pertaining to the field devices, uses this information to implement a control routine and then generates control signals that are sent over the buses or other communication lines to the field devices to control the operation of the process control system.

BRIEF DESCRIPTION OF THE DRAWINGS

FIG. 4 illustrates an example interface used to define security event patterns used by the example monitoring agent of FIGS. 2 and 3 to detect security events.

FIG. 5 illustrates an example interface used to define actions by the example monitoring agent of FIGS. 2 and 3 to respond to the detection of security events.

SUMMARY

Figure 1:
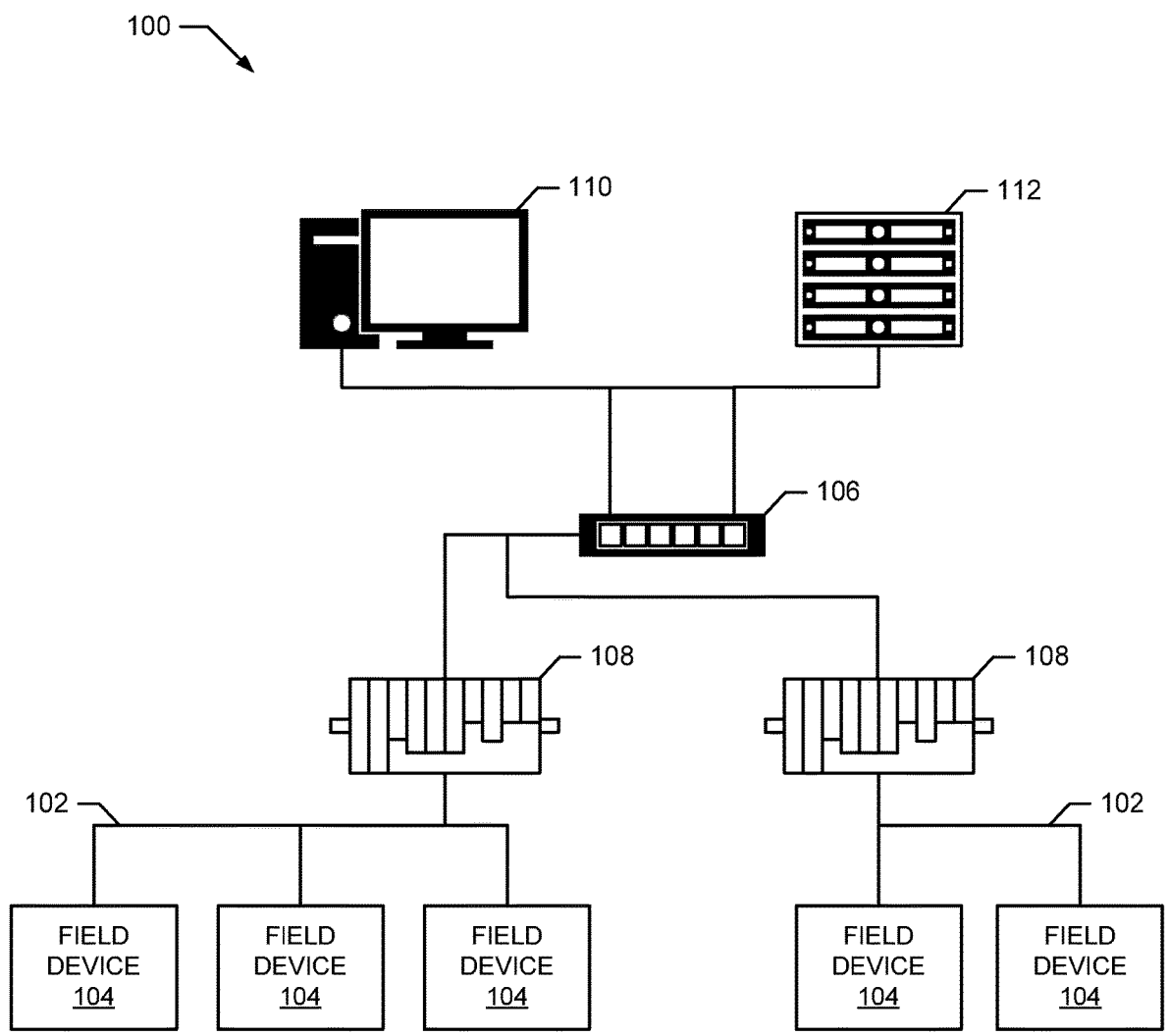
FIG. 1 illustrates an example process control system.

Example disclosed methods of security event detection in a computing device of a process control system involve monitoring usage of a plurality of resources by a first virtual machine executing on the computing device by a monitoring agent, the monitoring agent executing on the computing device separate from the first virtual machine. Example disclosed methods also involve detecting a potential security event by comparing the usage of the plurality of resources to resource usage patterns. Example disclosed methods also involve assigning a severity level to the detected potential security event, and initiating a security action based on the assigned severity level.

Example disclosed apparatus include a resource monitor to, via a processor, monitor usage of a plurality of resources by a first virtual machine executing on a computing device, the resource monitor being separate from the first virtual machine, and detect a potential security event by comparing the usage of the plurality of resources to resource usage patterns. Example disclosed apparatus also include a security event handler to assign a severity level to the detected potential security event, and initiate a security action defined for the assigned severity level.

An example disclosed tangible computer readable storage medium includes instructions which, when executed, cause a monitoring agent to monitor usage of a plurality of resources by a first virtual machine executing on a computing device, the monitoring agent to execute on the computing device separate from the first virtual machine. The example disclosed tangible computer readable storage medium also includes instructions that, when executed, cause the machine to detect a potential security event by comparing the usage of the plurality of resources to resource usage patterns. The example disclosed tangible computer readable storage medium also includes instructions that, when executed, cause the machine to assign a severity level to the detected potential security event, and to initiate a security action defined for the assigned severity level.

DETAILED DESCRIPTION

The present disclosure relates generally to process control systems and, more particularly, to methods and apparatus for security event detection through virtual machine introspection. Process control systems include workstations and/or servers that execute process control applications that interact with controllers to perform routines, control strategies, and/or algorithms that manage field devices located in the control system. The field devices may be, for example, valves, valve positioners, switches and transmitters, and may perform process control functions such as opening or closing valves and measuring process control parameters. In addition to managing field devices, controllers may generate process data (e.g., process control information) based on information received from the field devices. The process data may include process statistics, alarms, monitoring information, process trend information, diagnostic information, field device status information, and/or messages from the field devices.

Process control systems often rely on security utilities, such as anti-virus software, application whitelisting, software firewalls, and/or operating system security mechanisms to protect workstations and/or servers involved in the process control system from malicious attacks. However, such security utilities can be bypassed. Modern malware is capable of disabling or evading anti-virus utilities and inserting itself into actively running processes. For example, malware can install root kits (e.g., malware that affects the kernel of an operating system) and boot kits (e.g., malware that affects the boot process of a computer). Often, root kits and boot kits actively hide their activity and load before security utilities. This allows the malware to establish itself and remain on the compromised computer without being detected. In some examples, malware can establish backdoors to a compromised system, allowing an attacker to bypass normal security utilities and authentication credentials (e.g., user name and password, authentication code, etc.). In some examples, malware can lie dormant and undetected until an attacker is ready to use the malware to accomplish a larger objective.

As disclosed below, process control applications are executed in virtualized environments (e.g., virtual machines, containers, etc.). In a virtualized environment, a manager (e.g., a hypervisor, a container daemon, etc.) manages the virtualized environments (e.g., deploys, terminates, monitors, etc.), and allows multiple instances of virtualized environments to execute on the same physical hardware. Additionally, the manager segregates the virtualized environments from the physical hardware. The manager creates virtual hardware (e.g., virtual processor(s), virtual memory, virtual storage, etc.) and moderated access to those virtual resources. The manager allows visibility into the activities of the virtualized environment. For example, the manager has access to use of memory, storage disks, network, and peripheral hardware (e.g., Universal Serial Bus (USB) drives, CD/DVD drives, etc.), etc. within the virtualized environment. The virtualized environments execute guest operating systems (OS) that use the virtual resources. The guest OS executes as if it was installed natively (e.g., has direct access to physical hardware). Malware that is installed in the guest OS may disable security utilities executing within the same virtualized environment. However, in such a configuration, the malware cannot affect the manager or process control applications executing in a different virtualized environment.

To detect malware that is programmed to mask its activity, a monitoring agent is deployed by the manager. As disclosed below, the monitoring agent is separated from the virtualized environment the monitoring agent is monitoring. For example, the monitoring agent is executing in a different virtual machine, container, or physical machine than the virtual machine or container being monitored. The monitoring agent monitors activity of one or more virtualized environments. In such a manner, the malware in the virtualized environment cannot affect the monitoring agent. In some examples, the monitoring agent is incorporated into the manager.

In some examples described below, the monitoring agent uses introspection to monitor the virtualized environment. Normally, because the virtualized environments are segregated from other processes executing on a host, information regarding use of virtualized resources is not available to the other processes. Introspection is a process where an application outside the virtualized environment (e.g. the monitoring agent) is granted access to inspect usage of virtualized resources by the manager. Introspection allows the monitoring agent to analyze the states (e.g., memory values, processor registers, etc.) of the guest OS and/or process control applications executed by the guest OS. Through introspection, the monitoring agent monitors resource usage of the virtualized environment. For example, the monitoring agent may monitor memory usage, storage disk usage, network usage, and peripheral hardware usage, etc.

The monitoring agent compares resource usage to security event patterns. The security event patterns define uses of resources by the guest OS that indicate a likelihood that malware is installed in the virtualized environment. For example, a security event pattern may be defined to detect network usage that indicates that the address resolution protocol (ARP) table has been poisoned. In such a scenario, the ARP table is a short-term memory of addresses of computers on a network. By poisoning the ARP table, malware may, for example, put a false address on the computer's ARP table to facilitate a man-in-the-middle attack on the network. An example security event pattern to detect a poisoned ARP table may include detecting transmitted Ethernet frames with different Media Access Control (MAC) address to Internet Protocol (IP) address mappings than previous values.

As described below, security event patterns are associated with different levels of severity. The level of severity may be a designation and/or a numerical value that indicates the likelihood that malware has been installed in a virtualized environment and/or the harmfulness of the detected malware. For example, the security event patterns may be associated with a high, medium and/or low severity. For example, because unauthorized USB devices may be a source of malware, a security event pattern that detects an insertion of a USB device may be associated with a low severity level. As another example, a security event pattern that detects a large number of attempts to connect to the virtualized environment through the network may be associated with a medium severity level. As another example, a security event pattern that detects that certain memory values are different from initial instantiation of the virtualized environment may be associated with a high severity level.

As described below, the monitoring agent may initiate one or more actions based on the severity of a detected security event pattern. For example, for a low severity security event pattern, the monitoring agent may cause an alert to be displayed on a workstation and/or an alert message to be sent to an administrator. As another example, for a medium severity security event pattern, the monitoring agent may cause the virtualized environment to go into read-only mode (e.g., process control applications can only read the state of field devices but cannot issue commands to the field devices). As another example, for a severe security event pattern, the monitoring agent may cause a replacement virtual environment to be deployed and cause the affected virtual environment to be terminated.

As described below, in some examples, the monitoring agent assigns an integrity level (e.g., a trust level) to the virtualized environment. The integrity level represents the likelihood that the virtualized environment has been compromised. When the monitoring agent detects a security event pattern, the monitoring agent adjusts the integrity level depending on the severity associated with the security event pattern. For example, when a virtualized environment is initially deployed, the monitoring agent may assigned an integrity level of 100 to the virtualized environment. In such an example, upon detecting a low level security event pattern, the monitoring agent may reduce the integrity level by a set amount (e.g., one, five, ten, etc.). In some examples, the effects of a detected security event pattern decay over time. For example, the monitoring agent may remove the effects to the integrity level of a low severity security event pattern after twenty-four hours after the low severity security event pattern was detected. In some examples, an administrator sets one or more integrity level thresholds and defines security actions for the monitoring agent to execute in response to the integrity level satisfying an integrity level threshold. For example, at an integrity level threshold of 75 out of 100, the monitoring agent may send an alert to the administrator. As another example, at an integrity level threshold of 50 out of 100, the monitoring agent may set the virtualized environment so that application executing in the virtualized environment can only read the status of field devices, but cannot send commands to field devices or external computers. As another example, at an integrity level threshold of 25 out of 100, the monitoring agent may cause a replacement virtual environment to be deployed and cause the affected virtual environment to be terminated.

As described below, an administrator defines security event patterns based on, for example, memory usage, storage disk usage, network usage, and hardware usage. Example memory usage includes reading from and/or writing to volatile and non-volatile memory, values stored in memory, and/or use of functions related to access to memory (e.g., memory allocation, memory zeroing, etc.) Example storage disk usage includes reading and writing to storage disks, values stored on the storage disk (e.g. the master boot record, registry files, etc.), and use of functions related to access to memory (e.g., directory management, volume management, etc.). Example network usage includes messages sent and received over a network connection, connection attempts, etc. Example hardware usage includes processor usage, hardware interrupts, detection of peripheral hardware, keyboard input, etc. In some examples, the administrator defines actions for the monitoring agent to perform in response to detecting a security event pattern. Additionally, in some examples, the administrator defines effects that detecting a security event pattern has on the integrity level of the virtualized environment.

FIG. 1 illustrates an example process control system 100 usable in conjunction with the security event detection system described herein. The example system 100 employs a plant process control architecture that integrates one or more smart plant capabilities including field buses 102 (such as HART® and/or FOUNDATION™ field buses), high-speed discrete busses, embedded advanced control, and advanced unit and batch management. Field busses network field devices 104 inside the process control system 100 and provide an infrastructure for a variety of applications, including device management, configuration, monitoring, and diagnostics, etc.

The example process control system 100 includes the example field devices 104, an example controller 106, example I/O devices 108, an example workstation 110 and an example server 112. The example field devices 104 control and/or monitor processes and may, for example, include valves, sensors, proximity switches, motor starters, drives, etc. In the illustrated example, the field devices 104 are commutatively coupled via the fieldbus 102 to the I/O devices 108. The example I/O devices 108 facilitate communication with the example field devices 104. The example I/O devices 108 support a variety of modules to communicate (e.g., via digital and/or analog communication) with a variety of field devices 104. For example, an I/O device 108 may have an analog module to interface with a three-wire temperature probe and a digital module to interface with a digital valve controller. The example I/O devices 108 receive data from the field devices 104 and convert the data into communications capable of being processed by the example controller 106. Additionally, the example I/O devices 108 convert data and/or communications from the example controller 106 into a format capable of being processed by the field devices 104. In some examples, the I/O devices 108 and the controller(s) 106 are combined into one unit.

The example controller 106 is coupled to the workstation 110 and/or the server 112 via a wired or wireless network (e.g., a LAN, a WAN, the Internet, etc.). The example controller 106 controls routines to calculate process data based on outputs from the field device 104 for process control applications including, for example, monitoring applications, alarm management applications, process trending and/or history applications, diagnostic applications, batch processing and/or campaign management applications, statistical applications, streaming video applications, advanced control applications, safety instrumented applications, event applications, etc. The controller 106 forwards process data to the workstation 110 and/or the server 112 at periodic intervals and/or upon processing or generating the process data. The process data transmitted by the controller 106 may include process control values, data values, alarm information, text, block mode element status information, diagnostic information, error messages, parameters, events, and/or device identifiers.

In the example illustrated in FIG. 1, the workstation 110 and/or the server 112 execute process control applications. The process control applications communicate with the example controller 106 to monitor, control, and/or diagnose the field devices 104. For example, the process control applications may include control automation, graphical representations of the process control system 100, change management, process control editing, data collection, data analysis, etc. In some examples, the workstation 110 displays the process control applications via a user interface to render process data in a graphical format to enable a user of the workstation 110 to graphically view (via an application) the process data generated by the field devices 104. In some examples, when the process control application is executing on the server 112, an operator may establish a remote connection from a workstation (e.g., the workstation 110) to the server 112 to access to the process control applications.

In some examples, to improve security and scalability, the process control applications may be executed by guest operating systems (OSs) in virtualized environments (e.g., virtual machines, containers, etc.) on the workstation 110 and/or the server 112. As disclosed in further detail below, the virtualized environments segregate the process control applications executed by the guest OS from the physical hardware of the workstation 110 and/or the server 112. Executing the process control applications in virtualized environments also allows process control applications to be segregated from each other. For example, if one process control application is compromised (e.g., has a security event), other process control application executing on the same workstation 110 and/or the server 112 in different virtualized environments remain unaffected.

Figure 2:
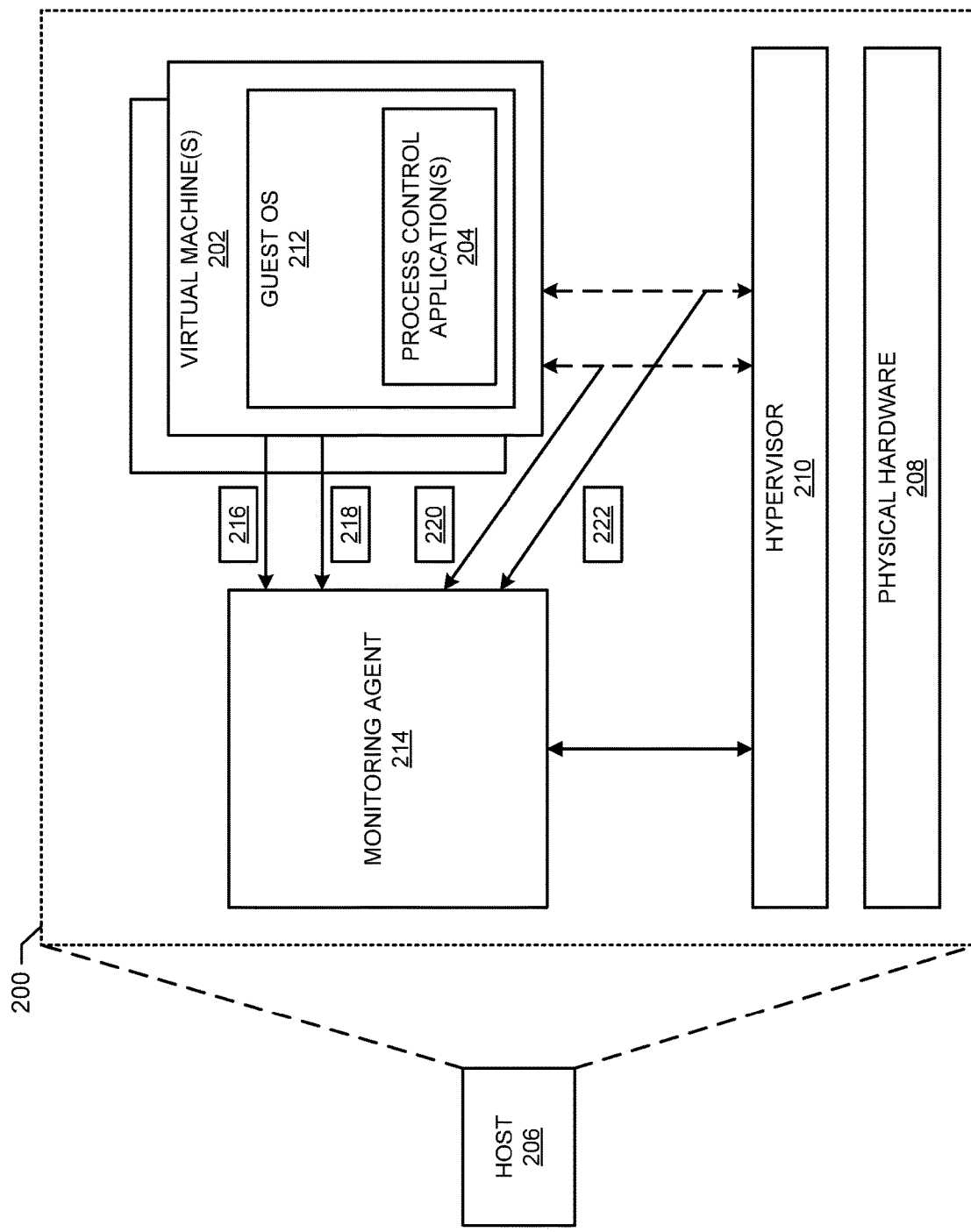
FIG. 2 illustrates an example system to detect security events on virtual machines executing process control applications.

FIG. 2 illustrates an example system 200 to detect security events on virtual machines 202 with process control applications 204. In the illustrated example, the system 200 executes on a host 206 (e.g., the workstation 110, the server 112, the controller 108, the I/O devices 108 of FIG. 1, etc.). The host 206 includes physical hardware 208 (e.g., processor(s), memory, storage, peripheral devices, network access, etc.) and a hypervisor 210. The example hypervisor 210 manages the physical hardware 208 and creates virtualized hardware (e.g., virtualized processor(s), virtualized memory, virtualized storage, etc.) that allows multiple virtual machines 202 to execute on the host 206. The example hypervisor 210 segregates the example virtual machine(s) 202 and controls access to the example physical hardware 208. In such a manner, if a security event is detected that compromises a guest OS 212 (e.g., Windows®, Linux, UNIX, etc.) executing on a virtual machine 202, the other virtual machines and/or the physical resources 208 are protected.

In the illustrated example, a monitoring agent 214 runs in the system 200. The example monitoring agent 214 is structured to detect security event patterns. The security event patterns are patterns of memory usage 216, storage disk usage 218, network usage 220, and/or hardware usage 222 that indicate a likelihood of malware being present on the guest OS 212. The example monitoring agent 214 is separate from the example virtual machine 202 so that malware present on the example guest OS 212 cannot affect the monitoring agent 214. For example, the monitoring agent 214 may be executing in a different virtual machine or different container than the process control applications 204. In some examples, the monitoring agent 214 is integrated into the hypervisor 210.

The example monitoring agent 214 includes introspection functions that facilitate real-time access to the memory usage 216, the storage disk usage 218, the network usage 220, and/or the hardware usage 222 of the virtual machine 202. Introspection functions allow the monitoring agent 214 to request information about the virtual machine 202 from the hypervisor 210. Because the hypervisor 210 creates and/or maintains the virtual resources, the introspection functions allow the monitoring agent 214 to correlate virtual resources to physical resources 208 so that the monitoring agent 214 can inspect the contents and usage of the physical resources used by the virtual machine 202. For example, the hypervisor 210 may maintain a virtual memory page table that maps virtual memory to physical memory. In such an example, when the monitoring agent 214 monitors the virtual memory used by the virtual machine 202, the introspection functions allow the monitoring agent 214 to access the virtual memory page table to know which locations in physical memory are being used by the virtual machine 202.

In the example illustrated in FIG. 2, the monitoring agent 214 monitors the memory usage 216, storage disk usage 218, network usage 220, and/or hardware usage 222 in real-time (e.g. resource usage 216-222 is monitored within seconds of it occurring) to detect security event patterns that give rise to inferences that the malware has been installed on the virtual machine 202. For example, the resource monitor 214 may detect a change to the master boot record on the storage disk shortly after the change occurs. In some examples, the monitoring agent 214 detects discrete events. For example, the monitoring agent 214 may detect when certain memory values change. In some examples, the monitoring agent 214 detects continuous events. For example, the monitoring agent 214 may monitor Ethernet frames to detect poisoning of the ARP table (e.g., detect Ethernet frames with different Media Access Control (MAC) address to Internet Protocol (IP) address mappings than previous values).

In some examples, the monitoring agent 214 communicates with an administrator to alert the administrator to when a security event pattern is detected and/or to communicate the integrity level of a particular virtual machine 202. In some examples, the monitoring agent 214 communicates with the hypervisor 210 to initiate responses to detected security event patterns. For example, in response to a particular security event pattern, the monitoring agent 214 may command the hypervisor 210 to only allow incoming network traffic to the affected virtual machine 202 so that process control applications 204 executing on the virtual machine 202 can receive status updates from field devices 104, but process control applications 204 cannot issue commands to the field devices 104 or communicate with other workstations and/or servers.

In some examples, the monitoring agent 214, from time to time (e.g., periodically, a periodically, etc.) causes a snapshot to be taken of the virtual machine 202. A snapshot is a copy of the state (e.g., the disk data, the memory values, the configuration, etc.) of the virtual machine 202 at a particular time. The snapshot may be used to return the virtual machine 202 to the captured state at a future time. In some examples, the snapshots may be scheduled (e.g., by an administrator). In some such examples, the monitoring agent 214 may cancel or delay a snapshot if a security event pattern of a certain severity (e.g. medium severity, high severity, etc.) has been detected and/or if the integrity level of the virtual machine 202 is below a certain threshold. In some examples, the monitoring agent 214 may cause a snapshot to be taken if the integrity level is above a threshold.

In some examples, in response to detecting a severe security event pattern and/or if the integrity level of the virtual machine 202 is below a threshold, the monitoring agent 214 may cause a new virtual machine 202 to be deployed by the hypervisor 210. In some examples, the new virtual machine 202 is based on a clean installation of the guest OS 204. In some examples, the new virtual machine 202 is based on a snapshot of the virtual machine 202 before the security event was detected. In some such examples, functionality (e.g., communication with field devices 104, communication display devices, etc.) is migrated to the new virtual machine 202. In some examples, after the new virtual machine 202 is in communication with the field devices 104, the monitoring agent 214 causes the compromised virtual machine 202 to be terminated.

Figure 3:
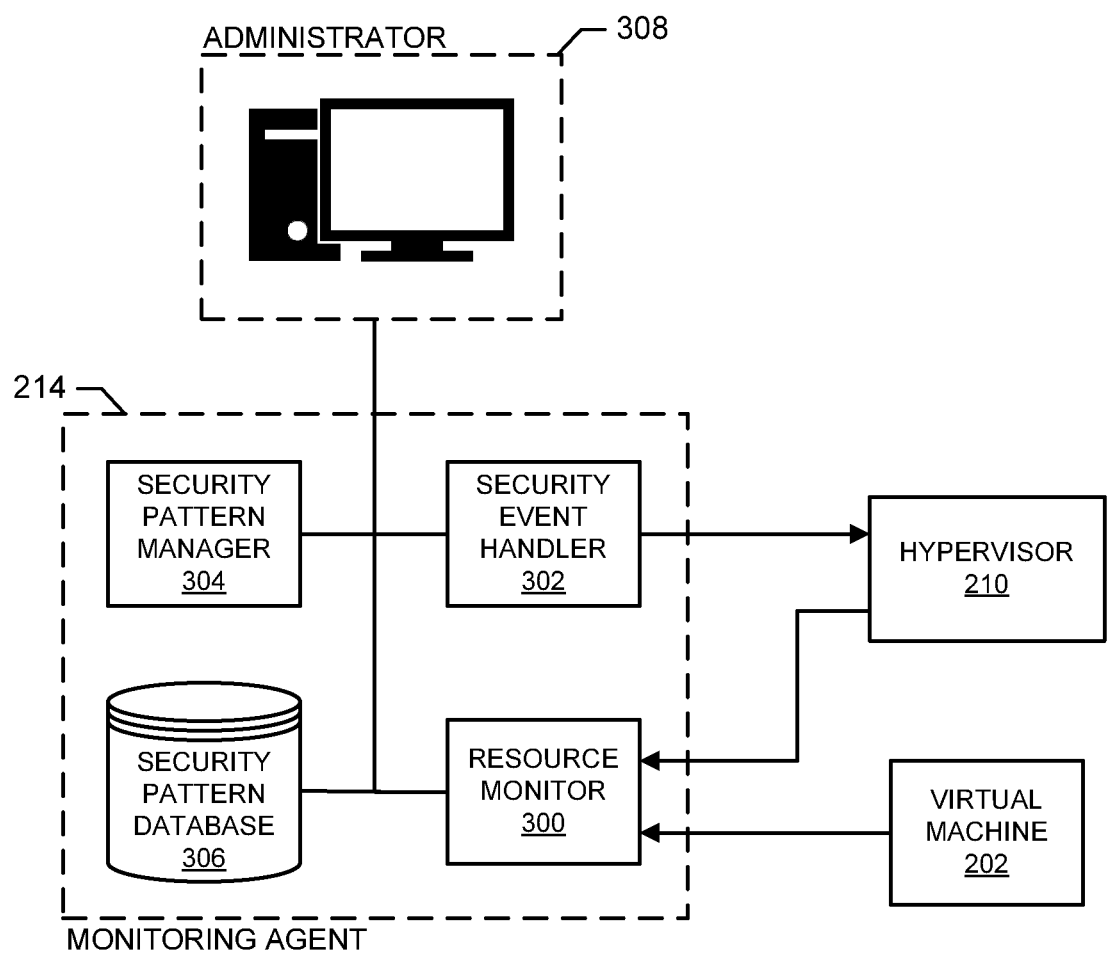
FIG. 3 illustrates an example implementation of the example monitoring agent of FIG. 2 to detect security events.

FIG. 3 illustrates an example implementation of the example monitoring agent 214 of FIG. 2 to detect security events. In the illustrated example, the monitoring agent 214 includes a resource monitor 300, a security event handler 302, a security event pattern manager 304, and a security event pattern database 306. The example resource monitor 300 monitors the memory usage 216, storage disk usage 218, network usage 220, and/or hardware usage 222 of the virtual machine 202. In the illustrated example, the resource monitor 300 monitors resource usage as the resources 216-222 are being used by the virtual machine 202. The example resource monitor 300 retrieves security event patterns from the security event pattern database 306 to determine which aspects of the resource usage 216-222 to monitor. For example, if a security event pattern is defined to monitor the ARP table, the resource monitor 300 monitors the network usage 220 to detect transmitted Ethernet frames with different Media Access Control (MAC) address to Internet Protocol (IP) address mappings than previous values (e.g., indicating that the ARP table has been poisoned). If resource usage 216-222 satisfies a security event pattern, the example resource monitor 300 informs the example security event handler 302 of the detected security event.

In the illustrated example, the security event handler 302 is structured perform security actions in response to the resource monitor 300 detecting a security event pattern. Security actions are actions for the monitoring agent 214 to perform as defined in a security event pattern and/or as defined by the severity level of the detected security event pattern. In some examples, the security actions are defined by an administrator 308 when a security event pattern and/or or severity level are defined. In the illustrated example, the security event handler 302 is in communication with the administrator 308. In some examples, the security event handler 302 sends a notification to the administrator 308. In some examples, the notification includes the information about the detected security event pattern and a timestamp. In some examples, the security event handler 302 notifies the administrator 302 that a security event pattern has been detected via a communication system (e.g., email, text message, voice message, etc.).

In the illustrated example of FIG. 3, the security event handler 302 is in communication with the hypervisor 210. In some examples, the security event handler 302 issue requests to the hypervisor 210 to restrict access to the physical resources 208 (FIG. 2) by the virtual machine 202. For example, the security event handler 302 may issue a request to prevent access to a peripheral device (e.g., a USB drive, a disk drive, etc.) or to prevent outgoing traffic on a network device. In some examples, the security event handler 302 may request that a new copy of the virtual machine 202 be deployed, communication with field devices 104, controllers 106, and/or I/O devices 108 be migrated to the new virtual machine 202, and the old virtual machine 202 be terminated.

In some examples, the security event handler 302 may manage (e.g., monitor, adjust, etc.) an integrity level of the virtual machine 202. The integrity level represents the likelihood that the virtual machine 202 has been compromised by malware. In some examples, when the security event handler 302 handles a security event pattern detected by the resource monitor 300, the security event handler 302 adjusts the integrity level of the virtual machine 202. In some examples, the effect on the integrity level depends on the severity associated with the security event pattern. For example, the integrity level of a virtual machine 202 may initially be set to 100. In such an example, if a security event pattern associated with a low severity is detected by the resource monitor 300, the security event handler 302 may reduce the integrity level of the virtual machine 202 to 95. The administrator 308 may define integrity level thresholds and corresponding security actions. For example, the administrator 308 may set an integrity level threshold so that the security event handler 302 alerts (e.g., displays an alert message, sends a message (e.g., an email, a page, a Short Message Service message (SMS), etc.)) when the integrity level of the virtual machine 202 falls below 75. In some examples, the security event handler 302 reverses the effects of a particular detected security event (e.g., raises the integrity level of the virtual machine 202, etc.) after a period of time based on the severity of the detected security event. For example, the effect of a low severity security event on the integrity level of a virtual machine 202 may be eliminated after twenty-four hours.

In the illustrated example of FIG. 3, the security event manager 304 manages (e.g., creates, deletes, modifies, etc.) security event patterns in the security event pattern database 306. As discussed in more detail below in connection with FIGS. 4 and 5, the example security event manager 304 provides an interface that allows the administrator 308 to define security event patterns and/or security actions, modify existing security event patterns and/or security actions, and/or delete existing security event patterns and/or security actions.

While an example manner of implementing the monitoring agent 214 of FIG. 2 is illustrated in FIG. 3, one or more of the elements, processes and/or devices illustrated in FIG. 3 may be combined, divided, re-arranged, omitted, eliminated and/or implemented in any other way. Further, the example resource monitor 300, the example security event handler 302, the example security event pattern manager 304 and/or, more generally, the example monitoring agent 214 of FIG. 2 may be implemented by hardware, software, firmware and/or any combination of hardware, software and/or firmware. Thus, for example, any of the example resource monitor 300, the example security event handler 302, the example security event pattern manager 304 and/or, more generally, the example monitoring agent 214 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). Further still, the example monitoring agent 214 of FIG. 2 may include one or more elements, processes and/or devices in addition to, or instead of, those illustrated in FIG. 3, and/or may include more than one of any or all of the illustrated elements, processes and devices.

FIG. 4 illustrates an example interface 400 that may be used to define security event patterns used by the example monitoring agent 214 of FIGS. 2 and 3 to detect security events. In some examples, the interface 400 is provided by the example security event manager 304 (FIG. 3). The example interface 400 is used to manage (e.g., create, delete, modify, etc.) security event patterns stored in the example security event pattern database 306 (FIG. 3). In the illustrated example, the interface 400 includes an example name field 402, an example severity field 404, an example category field 405, and an example condition field 406. The example name field 402 is provided to facilitate the example administrator 308 (FIG. 3) assigning a unique identifier to a security event pattern. The example severity field 404 is provided to facilitate the example administrator 308 assigning a severity level (e.g., high, medium, low, critical, urgent, serious, minimal, etc.) indicative of the likelihood that malware is installed on the virtual machine 202 (FIG. 2).

In the illustrated example, the category field 405 is provided to indicate the type of resource to which the security event pattern is related. For example, the category field 405 may indicate that a particular security event pattern is related to memory usage 216 (FIG. 2) The example condition field 406 is provided to facilitate the example administrator 308 creating one or more conditional statements that define which conditions relating to the memory usage 216, the storage disk usage 218, the network usage 220, and/or the hardware usage 222 (FIG. 2), if met, constitute a security event pattern. In some examples, the conditional statements are Boolean statements and/or thresholds related to properties the monitoring agent has access to through monitoring the memory usage 216, the storage disk usage 218, the network usage 220, and/or the hardware usage 222.

FIG. 5 illustrates an example interface 500 that may be used to define actions used by the example monitoring agent 214 of FIGS. 2 and 3 to respond to the detection of security event patterns. In some examples, the interface 500 is provided by the example security event manager 304 (FIG. 3). The example interface 500 is to facilitate an administrator (e.g., the administrator 308 of FIG. 3) to define actions to be performed by the example security event handler 302 (FIG. 3) in response to the resource monitor 300 (FIG. 3) detecting a security event pattern. In the illustrated example, the actions to be performed by the security handler 302 are defined based on severity. For example, in response to detecting a medium severity security event pattern, the security handler 302 may restrict the ability for process control applications 204 (FIG. 2) to issue commands to field devices 104. In some examples, the actions to be performed by the security handler 302 may be based on specific security event patterns.

Figure 6:
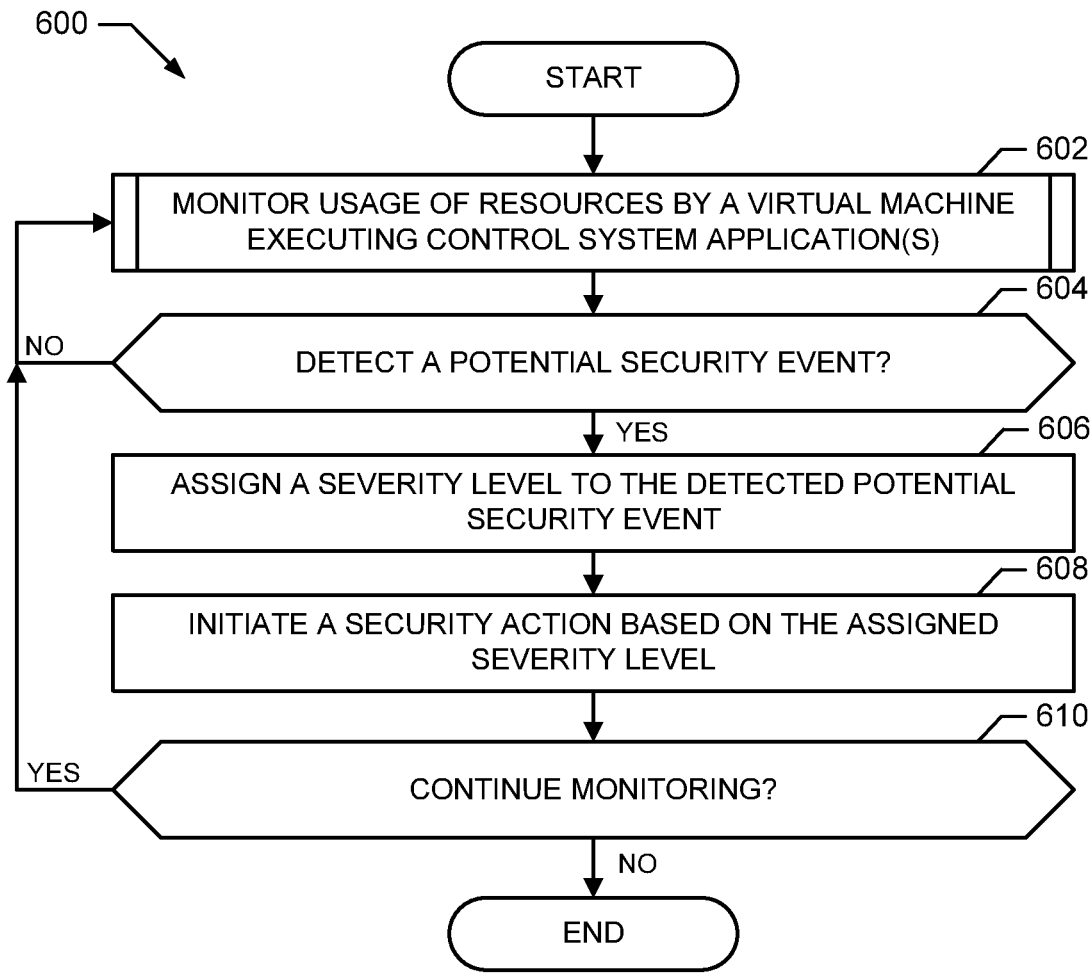
FIG. 6 is a flow diagram representative of an example method that may be executed to implement the monitoring agent of FIGS. 2 and 3 to detect security events.

Flowcharts representative of example methods for implementing the example monitoring agent 214 of FIGS. 2 and 3 are shown in FIGS. 6 and/or 7. In this example, the methods may be implemented using machine readable instructions that comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example programs are described with reference to the flowchart illustrated in FIGS. 6 and/or 7, many other methods of implementing the example monitoring agent 214 may alternatively be used. For example, the order of execution of the blocks may be changed, and/or some of the blocks described may be changed, eliminated, or combined.

As mentioned above, the example methods of FIGS. 6 and/or 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 6 and/or 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 6 is a flow diagram representative of an example method that may be used to implement the monitoring agent of FIGS. 2 and 3 to detect and respond to security events. Initially, the resource monitor 300 (FIG. 3) monitors the usage of resources by a virtual machine 202 (FIG. 2) executing process control applications 204 (FIG. 2) (block 602). Monitoring usage of resources at block 602 is discussed further below in conjunction with FIG. 7. The resource monitor 300 continues to monitor resource usage until a potential security event has been detected (block 604). The resource monitor 300 assigned a severity level to the detected potential security event (block 606). In some examples, the severity level is assigned based on a security event pattern stored in the security event pattern database 306. The security event handler 302 (FIG. 3) initiates a security action based on the assigned severity level (block 608). In some examples, the security action to be performed is predefined by an administrator 308 (FIG. 3). In some example, the security event handler 302 adjusts the integrity level of the virtual machine 202 based on the severity of the detected potential security event. The resource monitor 300 determines whether monitoring the virtual machine 202 is to be continued (block 610). If monitoring the virtual machine 202 is to be continued, the resource monitor 300 monitors the usage of resources used by a virtual machine 202 to detect potential security events (block 602). Otherwise, if monitoring the virtual machine 202 is not to be continued, the method 600 ends.

Figure 7:
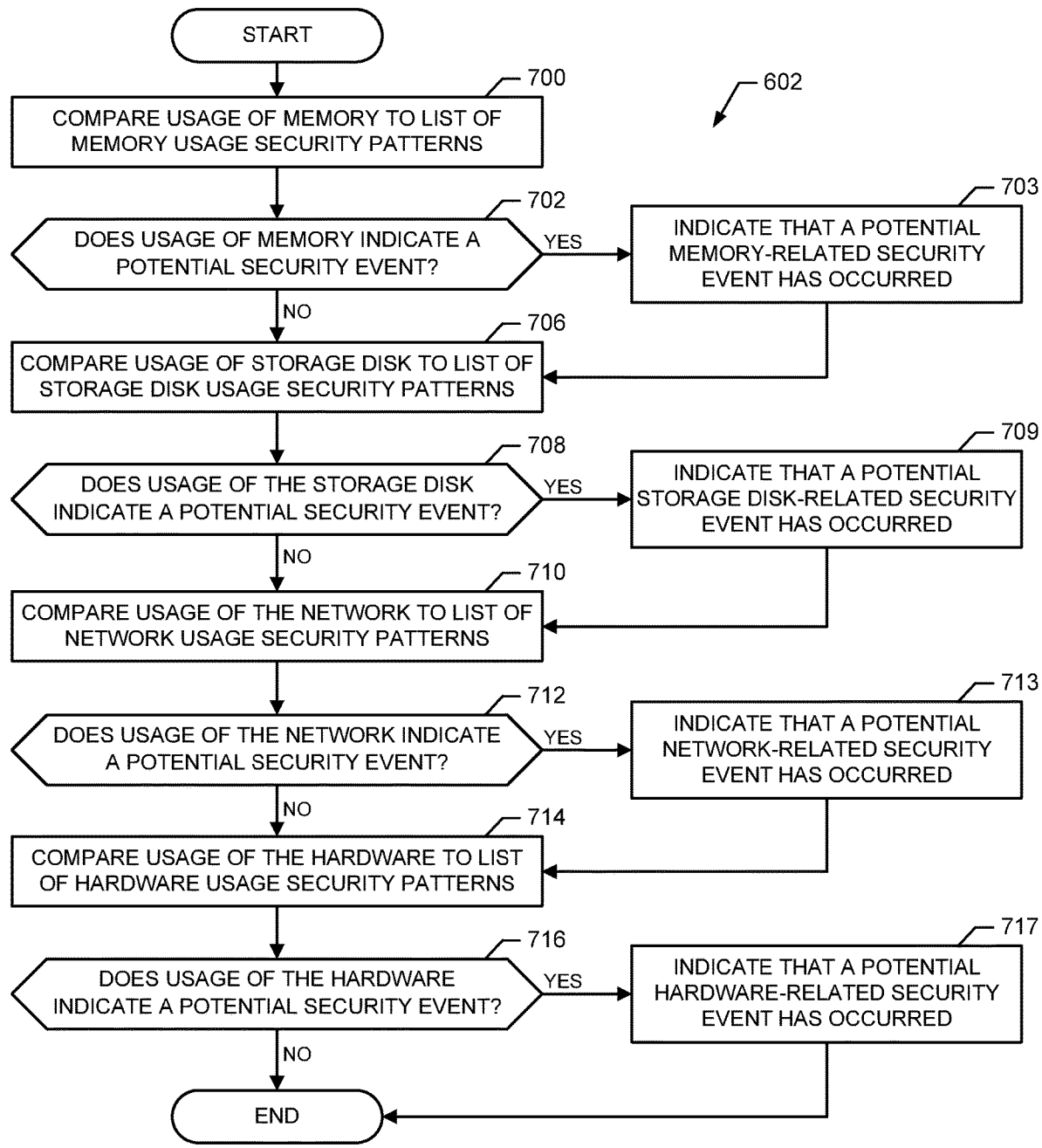
FIG. 7 is a flow diagram representative of an example method that may be executed to implement the monitoring agent of FIGS. 2 and 3 to detect security events.

FIG. 7 is a flow diagram representative of an example method that may be performed to implement the detection of security events at block 602 of FIG. 6. Initially, the resource monitor 300 (FIG. 3) monitors memory usage 216 (FIG. 2) of the virtual machine 202 (FIG. 2) and compares the usage to security patterns (block 700). The resource monitor 300 determines whether the memory usage 216 matches (e.g., satisfies a condition, satisfies a threshold, etc.) of a security event pattern in the security event pattern database 306 (FIG. 3) (block 702). In some examples, the memory usage 216 is compared to the security event patterns in the security event pattern database 306 related to memory usage as indicated by the type field 405 of FIG. 4. If the resource monitor 300 determines that memory usage 216 matches a security event pattern, the resource monitor 300 indicates (e.g., to the security event handler 302) that a potential memory-related security event has occurred (block 703).

The resource monitor 300 monitors storage disk usage 218 (FIG. 2) of the virtual machine 202 (block 706). The resource monitor 300 determines whether the storage disk usage 218 matches (e.g., satisfies a condition, satisfies a threshold, etc.) of a security event patterns in the security event pattern database 306 (block 708). In some examples, the storage usage 218 is compared to the security event patterns in the security event pattern database 306 related to storage disk usage as indicated by the type field 405. If the resource monitor 300 determines that storage disk usage 218 matches a security event pattern, the resource monitor 300 indicates (e.g., to the security event handler 302) that a potential storage-disk security event has occurred (block 709).

The resource monitor 300 monitors network usage 220 (FIG. 2) of the virtual machine 202 (block 710). The resource monitor 300 determines whether the network usage 220 matches (e.g., satisfies a condition, satisfies a threshold, etc.) of a security event patterns in the security event pattern database 306 (block 712). In some examples, the network usage 220 is compared to the security event patterns in the security event pattern database 306 related to network usage as indicated by the type field 405. If the resource monitor 300 determines that network usage 220 matches a security event pattern, the resource monitor 300 indicates (e.g., to the security event handler 302) that a potential network-related security event has occurred (block 713).

The resource monitor 300 monitors hardware usage 222 (FIG. 2) of the virtual machine 202 (block 714). The resource monitor 300 determines whether the hardware usage 222 matches (e.g., satisfies a condition, satisfies a threshold, etc.) of a security event patterns in the security event pattern database 306 (block 716). In some examples, the hardware usage 222 is compared to the security event patterns in the security event pattern database 306 related to hardware usage as indicated by the type field 405. If the resource monitor 300 determines that hardware usage 222 matches a security event pattern, the resource monitor 300 indicates (e.g., to the security event handler 302) that a potential hardware-related security event has occurred (block 717). The method 700 then ends.

Figure 8:
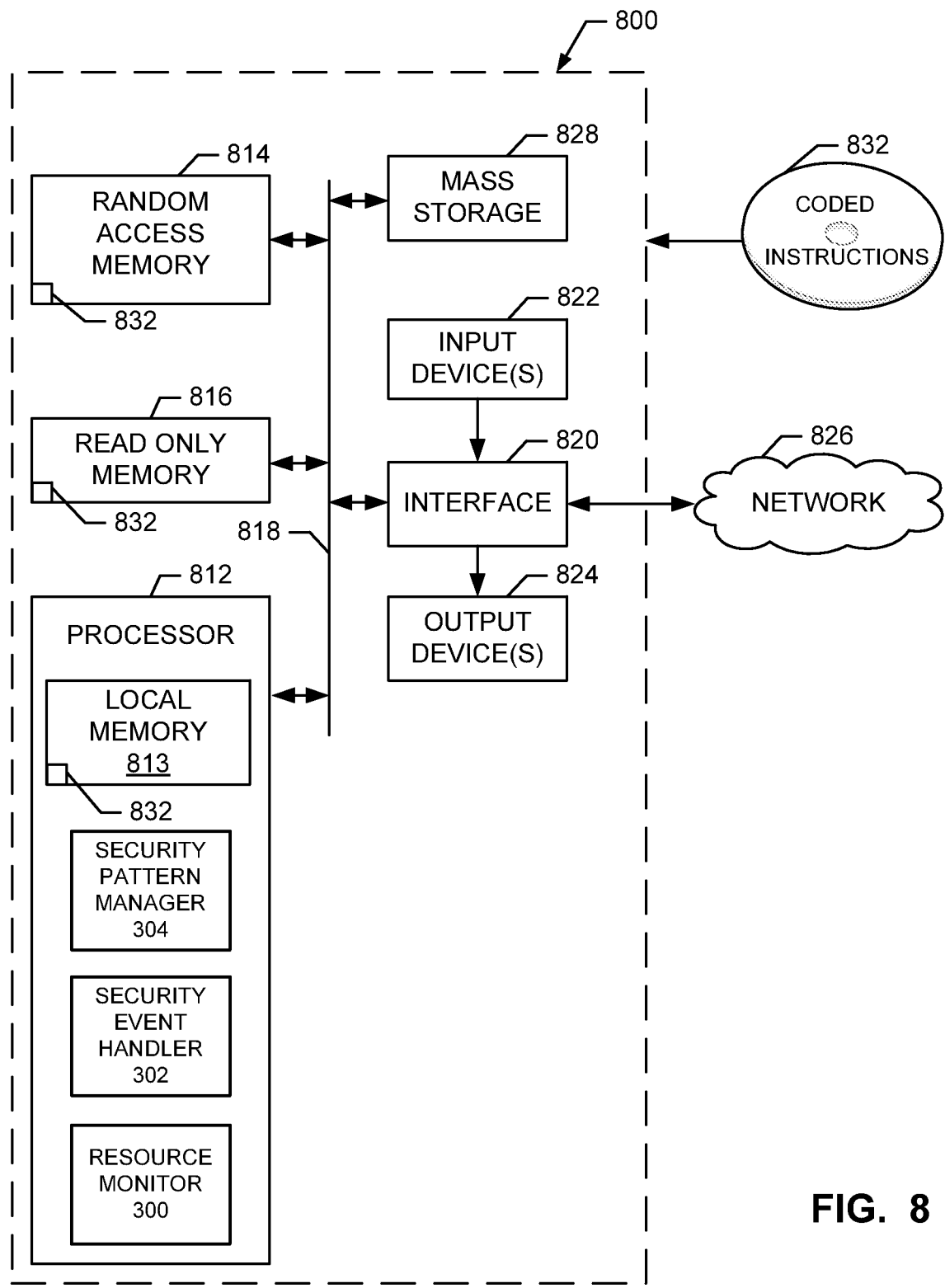
FIG. 8 is a block diagram of an example processor system structured to execute machine readable instructions to perform the methods represented by FIG. 6 and/or 7 to implement the example monitoring agent of FIGS. 2 and 3.

FIG. 8 is a block diagram of an example processor platform 800 structured to execute instructions to implement the methods of FIGS. 6 and/or 7 and the monitoring agent 214 of FIGS. 2 and 3. The processor platform 800 can be, for example, a server, a personal computer, a workstation, or any other type of computing device.

The processor platform 800 of the illustrated example includes a processor 812. The processor 812 of the illustrated example is hardware. In the illustrated example, the processor 812 includes an example resource monitor 300, an example security event handler 302, and an example security event pattern manager 306. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

Coded instructions 832 to implement the methods of FIGS. 6 and/or 7 may be stored in the mass storage device 828, in the volatile memory 814, in the non-volatile memory 816, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method of security event detection in a computing device of a process control system, comprising:
   monitoring usage of a plurality of resources by a first virtual machine executing on the computing device by a monitoring agent, the monitoring agent executing on the computing device separate from the first virtual machine;
   detecting a first potential security event at a first time by comparing a first usage of the plurality of resources to predetermined security event resource usage patterns;
   determining a first severity level for the first potential security event based on comparing the first usage of the plurality of resources to the predetermined security event resource usage patterns, the first severity level indicative of a first likelihood that the first virtual machine has been compromised by malware;
   reducing an integrity level assigned to the first virtual machine based on the first severity level;
   detecting a second potential security event at a second time by comparing a second usage of the plurality of resources to the predetermined security event resource usage patterns;
   determining a second severity level for the second potential security event based on comparing the second usage of the plurality of resources to the predetermined security event resource usage patterns, the second severity level indicative of a second likelihood that the first virtual machine has been compromised by malware;
   reducing the integrity level assigned to the first virtual machine based on the second severity level such that the integrity level is indicative of a combined effect on the first virtual machine of the second potential security event and the first potential security event; and
   in response to determining the integrity level is below a threshold, initiating a security action, wherein the security action is defined in connection with the predetermined security event resource usage patterns.

2. A method as defined in claim 1, wherein the monitoring agent communicates with a hypervisor managing the first virtual machine to monitor the usage of the plurality of resources by the first virtual machine.

3. A method as defined in claim 1, wherein the monitoring agent is executing in a second virtual machine on the computing device.

4. A method as defined in claim 1, wherein the monitoring agent is part of a hypervisor that manages the first virtual machine.

5. A method as defined in claim 1, wherein the monitoring agent monitors at least one of memory usage, storage disk usage, network usage, and hardware usage of the first virtual machine.

6. A method as defined in claim 1, wherein, in response to assigning a highest severity level to the first potential security event, initiating the security action comprises:

causing a second virtual machine to instantiate on the computing device based on a snapshot of the first virtual machine created before the first potential security event was detected;

migrating functionality of the first virtual machine to the second virtual machine; and terminating the first virtual machine.

7. A method as defined in claim 1, further comprising:
obtaining a snapshot of the first virtual machine when the integrity level is above a second threshold; and delaying the obtaining of the snapshot when the integrity level is below the second threshold.

8. A method as defined in claim 1, further comprising increasing the integrity level a threshold period of time after detecting the first potential security event.

9. A method as defined in claim 1, further including managing a category field and a condition field to define, before monitoring usage of the plurality of resources, the predetermined security event resource usage patterns, the category field indicative of a type of resource to which the predetermined security event resource usage patterns are related and the condition field indicative of which conditions, when met, constitute a security event for each of the predetermined security event resource usage patterns.

10. An apparatus comprising:
a memory;
a resource monitor, executed via a hardware processor and machine readable instructions stored in the memory, to:
monitor usage of a plurality of resources by a first virtual machine executing on a computing device, the resource monitor being separate from the first virtual machine, and detect a first potential security event at a first time by comparing a first usage of the plurality of resources to predetermined security event resource usage patterns determine a first severity level for the first potential security event based on comparing the first usage of the plurality of resources to the predetermined security event resource usage patterns, the first severity level indicative of a first likelihood that the first virtual machine has been compromised by malware; and a security event handler, executed via the hardware processor and machine readable instructions stored in the memory, to:
reduce an integrity level assigned to the first virtual machine based on the first severity level;

detect a second potential security event at a second time by comparing a second usage of the plurality of resources to the predetermined security event resource usage patterns;

determine a second severity level for the second potential security event based on comparing the second usage of the plurality of resources to the predetermined security event resource usage patterns, the second severity level indicative of a second likelihood that the first virtual machine has been compromised by malware;

reduce the integrity level assigned to the first virtual machine based on the second severity level, the integrity level indicative of a combined effect on the first virtual machine of the second potential security event and the first potential security event; and in response to determining the integrity level is below a threshold, initiate a security action, wherein the security action is defined in connection with the predetermined security event resource usage patterns.

11. An apparatus as defined in claim 10, wherein the resource monitor is to communicate with a hypervisor managing the first virtual machine to monitor the usage of the plurality of resources of the first virtual machine.

12. An apparatus as defined in claim 10, wherein the resource monitor is part of a hypervisor that manages the first virtual machine.

13. An apparatus as defined in claim 10, wherein the resource monitor is to monitor at least one of memory usage, storage disk usage, network usage, and hardware usage of the first virtual machine.

14. An apparatus as defined in claim 10, wherein, in response to assigning a highest severity level to the first potential security event, the security event handler is to:
cause a second virtual machine to instantiate on the computing device based on a snapshot of the first virtual machine created before the first potential security event was detected;

migrate functionality of the first virtual machine to the second virtual machine; and terminate the first virtual machine.

15. An apparatus as defined in claim 10, wherein the resource monitor manages a category field and a condition field to define, before monitoring usage of the plurality of resources, the predetermined security event resource usage patterns, the category field indicative of a type of resource to which the predetermined security event resource usage patterns are related and the condition field indicative of which conditions, when met, constitute a security event for each of the predetermined security event resource usage patterns.

16. A tangible computer readable storage medium comprising instructions which, when executed, cause a monitoring agent to at least:
monitor usage of a plurality of resources by a first virtual machine executing on a computing device, the monitoring agent to execute on the computing device separate from the first virtual machine;

detect a first potential security event at a first time by comparing a first usage of the plurality of resources to predetermined security event resource usage patterns;

determine a first severity level for the first potential security event based on comparing the first usage of the plurality of resources to the predetermined security event resource usage patterns, the first severity level indicative of a first likelihood that the first virtual machine has been compromised by malware;

reduce an integrity level assigned to the first virtual machine based on the first severity level;

detect a second potential security event at a second time by comparing a second usage of the plurality of resources to the predetermined security event resource usage patterns;

determine a second severity level for the second potential security event based on comparing the second usage of the plurality of resources to the predetermined security event resource usage patterns, the second severity level indicative of a second likelihood that the first virtual machine has been compromised by malware;

reduce the integrity level assigned to the first virtual machine based on the second severity level, the integrity level indicative of a combined effect on the first virtual machine of the second potential security event and the first potential security event; and in response to determining the integrity level is below a threshold, initiate a security action, wherein the security action is defined in connection with the predetermined security event resource usage patterns.

17. A tangible computer readable storage medium as defined in claim 16, wherein the instructions, when executed, cause the monitoring agent further to communicate with a hypervisor managing the first virtual machine to monitor the usage of the plurality of resources of the first virtual machine.

18. A tangible computer readable storage medium as defined in claim 16, wherein the monitoring agent is to execute in a second virtual machine on the computing device.

19. A tangible computer readable storage medium as defined in claim 16, wherein the monitoring agent is part of a hypervisor that manages the first virtual machine.

20. A tangible computer readable storage medium as defined in claim 16, wherein the instructions, when executed, cause the monitoring agent to monitor at least one of memory usage, storage disk usage, network usage, and hardware usage of the first virtual machine.

21. A tangible computer readable storage medium as defined in claim 16, wherein, in response to assigning a highest severity level to the first potential security event, the instructions, when executed, cause the monitoring agent to:
  cause a second virtual machine to instantiate on the computing device based on a snapshot of the first virtual machine created before the first potential security event was detected;
  migrate functionality of the first virtual machine to the second virtual machine; and
  terminate the first virtual machine.

22. A tangible computer readable storage medium as defined in claim 16, wherein the instructions, when executed, cause the monitoring agent to manage a category field and a condition field to define, before monitoring usage of the plurality of resources, the predetermined security event resource usage patterns, the category field indicative of a type of resource to which the predetermined security event resource usage patterns are related and the condition field indicative of which conditions, when met, constitute a security event for each of the predetermined security event resource usage patterns.

* * * * *